(12) United States Patent
Huang et al.

(10) Patent No.: US 10,498,615 B2
(45) Date of Patent: Dec. 3, 2019

(54) METHOD, APPARATUS AND SYSTEM FOR PROVIDING WIRELESS NETWORK SPEED INFORMATION

(71) Applicant: Google LLC, Mountain View, CA (US)

(72) Inventors: Jonathan Huang, Sunnyvale, CA (US); Joseph LaPenna, San Francisco, CA (US); Alexander Schiffhauer, Mountain View, CA (US); Alex Zheng, Millbrae, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/645,423

(22) Filed: Jul. 10, 2017

(65) Prior Publication Data

US 2019/0014021 A1    Jan. 10, 2019

(51) Int. Cl.
| | |
|---|---|
| *H04L 12/26* | (2006.01) |
| *H04B 17/318* | (2015.01) |
| *H04W 24/08* | (2009.01) |
| *G06F 3/0481* | (2013.01) |
| *H04W 48/18* | (2009.01) |
| *H04L 29/08* | (2006.01) |

(52) U.S. Cl.
CPC ........ *H04L 43/045* (2013.01); *G06F 3/04817* (2013.01); *H04B 17/318* (2015.01); *H04L 43/0894* (2013.01); *H04W 24/08* (2013.01); *H04W 48/18* (2013.01); *H04L 67/36* (2013.01)

(58) Field of Classification Search
CPC ..... H04W 48/16; H04W 12/06; H04W 48/12; H04W 48/20; H04W 4/70; H04W 52/367; H04W 84/12; H04W 36/32; H04W 60/00; H04W 64/006

USPC .......................................................... 370/252
See application file for complete search history.

(56) References Cited

U.S. PATENT DOCUMENTS

| | | | |
|---|---|---|---|
| 9,565,578 B2 | 2/2017 | Chu et al. | |
| 2005/0071476 A1 | 3/2005 | Tejaswini et al. | |
| 2007/0066304 A1 | 3/2007 | Lee | |
| 2007/0067734 A1 | 3/2007 | Cunningham et al. | |
| 2010/0083121 A1* | 4/2010 | Famolari ............... | H04W 48/18 715/736 |
| 2012/0196644 A1 | 8/2012 | Scherzer et al. | |
| 2014/0003408 A1 | 1/2014 | Chhabra et al. | |

(Continued)

OTHER PUBLICATIONS

Microsoft Windows phone screen shots; dated Oct. 10, 2016.

(Continued)

*Primary Examiner* — Natasha W Cosme
(74) *Attorney, Agent, or Firm* — Honigman LLP; Brett A. Krueger

(57) ABSTRACT

A wireless device and method detect a current signal strength of each of a number of wireless networks, determine an expected end-to-end data speed for each of the wireless networks using wireless network end-to-end data speed information that was historically compiled from prior connections with the wireless networks and using the detected current signal strength of each of the wireless networks. The wireless device and method connects to at least one wireless network based on the determined expected end-to-end data speed and/or provides a user interface that includes the determined expected end-to-end data speed and the detected signal strength indication of each of the wireless networks.

16 Claims, 11 Drawing Sheets

(56) References Cited

U.S. PATENT DOCUMENTS

| | | | |
|---|---|---|---|
| 2014/0022918 A1* | 1/2014 | Guo | H04W 48/20 370/252 |
| 2014/0064123 A1 | 3/2014 | Kim | |
| 2015/0110077 A1 | 4/2015 | Lee et al. | |
| 2017/0374167 A1* | 12/2017 | Takeshita | H04L 67/22 |

OTHER PUBLICATIONS

IOS phone screen shot; dated Oct. 10, 2016.
Android application screen shots; dated Oct. 10, 2016.
European Patent Office; International Search Report and Written Opinion; International Application No. PCT/US2018/028298; dated Jul. 5, 2018.

\* cited by examiner

METHOD, APPARATUS AND SYSTEM FOR PROVIDING WIRELESS NETWORK SPEED INFORMATION

BACKGROUND OF THE DISCLOSURE

Wireless devices, such as smart phones, tablets, laptops, wearables, desktops and other devices employ operating systems and/or applications that present a user with a graphic user interface that includes icons of multiple wireless networks such as multiple cellular networks and/or wireless access points such as WiFi wireless access points, that are within range of the wireless device. By way of example, some conventional operating systems or software applications only illustrate the signal strength as part of a cellular or WiFi icon for multiple networks along with a lock icon indicating whether the wireless access point (WAP) requires a password, a network name and an indication of which network is connected. However, such iconography does not typically illustrate how fast the network is in terms of throughput bandwidth or quality without first connecting to the network and performing speed tests. Requiring the wireless device to perform a speed test is extremely costly to compute, using battery life and takes additional time during a wireless access point connection process.

In other conventional examples, a graphic user interface with WAP iconography is employed to illustrate both signal strength and data speed (i.e., bandwidth in Mbps or Gbps) but do so in a confusing manner such that users are unable to adequately determine the best potential network. Typically, wireless network access point status or quality indication systems provide inadequate indications of both network signal strength and data speed because the data speed is actually indicative of simply the data speed between the wireless device and the wireless access point. However, the data speed of an end-to-end link from the user device to the content source providing the content being uploaded or downloaded can be much different than the speed to the user device to the WAP. Such inaccurate techniques result in poor user experiences and can result in connection to an undesirable network.

BRIEF DESCRIPTION OF THE DRAWINGS

The disclosure will be more readily understood in view of the following description when accompanied by the below figures and wherein like reference numerals represent like elements, wherein.

SUMMARY OF THE DISCLOSURE

Figure 1:
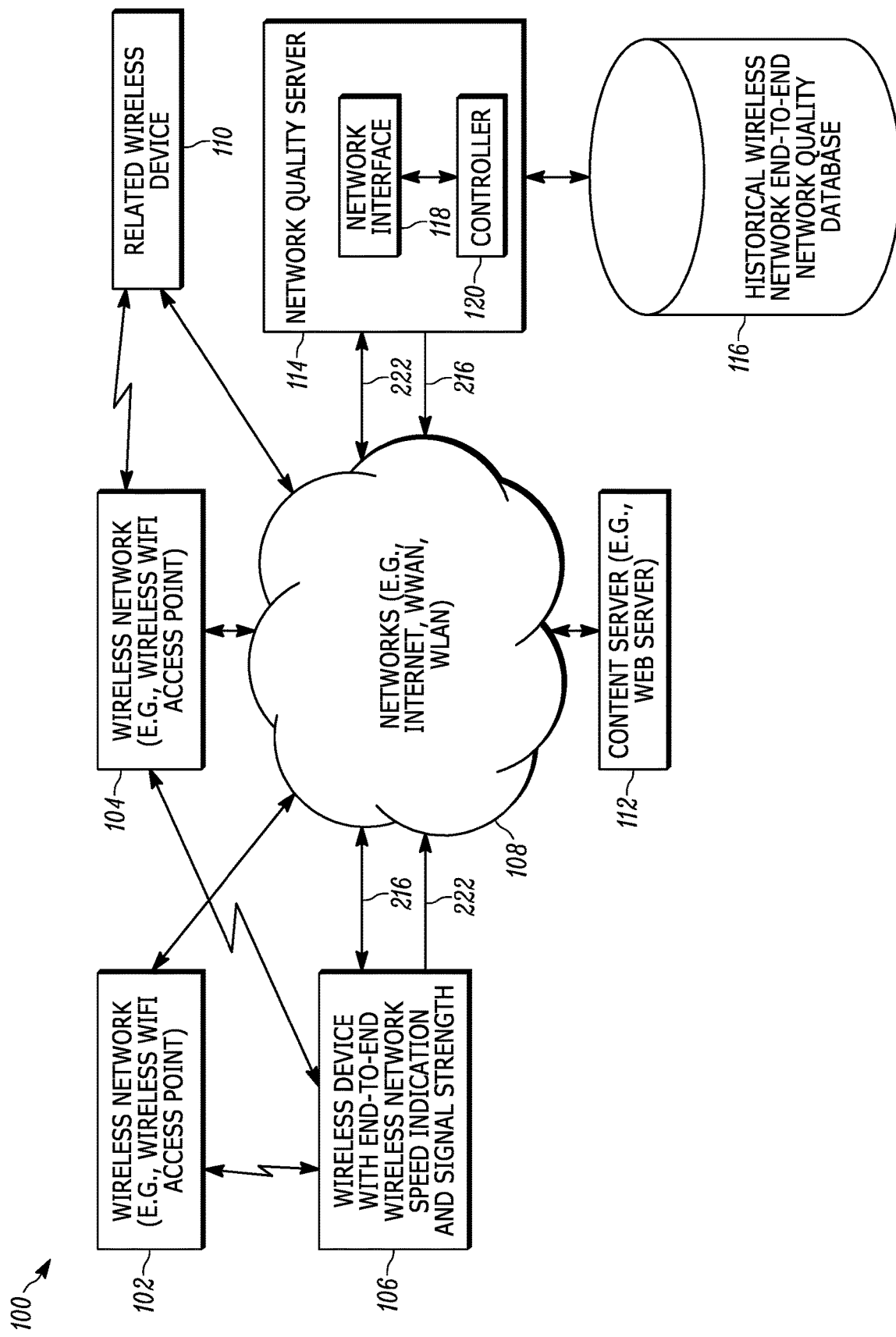
FIG. 1 is a block diagram illustrating a communication system employing a wireless device with end-to-end wireless network speed indication signal strength capability in accordance with one example set forth in the disclosure.

A wireless device and method are provided that detect a current signal strength of each of a number of wireless networks, determine an expected end-to-end data speed for each of the wireless networks using both wireless network end-to-end data speed information that was historically compiled from prior connections with the wireless networks and using the detected current signal strength of each of the wireless networks. The wireless device and method connect to at least one wireless network based on the determined expected end-to-end data speed and/or provides a user interface that includes the determined expected end-to-end data speed and the detected signal strength indication of each of the wireless networks. Using expected end-to-end data speed information in addition to current signal strength as disclosed is a relatively fast, accurate and battery saving approach and produces a more accurate indication of which of a plurality of wireless networks is most suitable.

In one example, a wireless device uses a remote server to provide historically compiled wireless network end-to-end data speed information from prior connections to the available networks by the wireless device, other wireless devices of different users and/or a same user. The wireless network end-to-end data speed information may take any suitable form including data representing speed/signal strength pairs, a set of speed scores and corresponding signal strength measurements, a table, one or more graphs or other information indicating previous end-to-end bandwidth capabilities using the wireless networks at previous signal strength levels such as average speed for a group of users at varying signal strengths. The wireless device (or user) uses both a current signal strength and the wireless network end-to-end data speed information to determine a best wireless network (e.g., a WAP). In another example, the wireless device compiles prior wireless network end-to-end data speed information from prior connections by the wireless device and stores it locally or remotely and retrieves it as needed.

In one example, a user interface is provided that provides improved iconography and improves user understanding of the speed and capability of the wireless network such as a cellular network, WiFi access point for a WiFi network or other wireless network that is available to the user. This improved iconography can help devices and users make better decisions about whether to connect to a particular wireless network, helps users diagnose potential problems more easily and provides an improved and more accurate connection system for a network that employs wireless access points. For example, potential device problems can be evident when the expected end-to end data speed indicates that a particular wireless network is fast but the device has a slow connection to the wireless network (e.g., indicating a likely problem with the wireless device instead of the wireless network).

In one example, a server, such as a web server or number of webservers, includes a database of historical wireless network end-to-end quality data which includes prior data speeds at prior signal strength levels for public wireless access points used in WiFi networks, personal networks that have been approved by a user or other wireless networks. This historical wireless network end-to-end network quality data includes wireless network end-to-end data speed data that was historically compiled from prior devices from prior connections with the plurality of wireless networks during previous internet sessions as approved by users. This is done using known bandwidth monitoring techniques during prior connection sessions from various internet content servers by wireless devices for sessions approved by users. These can include speed tests as well. In one example, the server (and/or wireless device) compiles a signal strength to data speed curve, table or set of historical speed and corresponding signal strength data. In one example, the database includes identifiers that associate a particular wireless network with the historical wireless network end-to-end data speed information that includes corresponding signal strengths measured at the time of the prior sessions. The historical wireless network quality data in the server may be, for example, average speed of the wireless networks that employs the WAP over a period of time observed from various internet connections employed by various software applications executing on various wireless devices, as approved by the users of those devices. As such, end-to-end (from a wireless device to an end device that provides content to the wireless device such as a content server through an HTTP request and corresponding HTTP response) network information is employed that is determined based on historical network speed and corresponding signal strength information. In one example, real time data speed information is also obtained by the wireless device during user approved sessions and used to adjust the historical end-to-end data speed information to take into account device variance in performance and local congestion of the network. This real time data speed information may also be sent to the server 114 to populate the historical database.

In one example, a method for providing a speed of a plurality of wireless networks includes detecting, by the wireless device, a current signal strength of each of the plurality of wireless networks. The method also includes determining, by the wireless device, an expected end-to-end data speed for each of the plurality of wireless networks using historical wireless network end-to-end data speed information, which in one example includes end to end data speed information at corresponding prior signal strength levels that was historically compiled from prior connections with the plurality of wireless networks at recorded signal strength levels for each of the plurality of wireless networks. The method includes providing, by the wireless device, a user interface that includes the determined expected end-to-end data speed and detected current signal strength indication of each of the plurality of wireless networks. The expected end-to-end data speed is determined from the historically compiled wireless network end-to-end data speed information from prior connections to the available networks prior to connecting to one of the plurality of wireless networks.

In one example, the method includes obtaining, by the wireless device from a remote network quality server, the wireless network end-to-end data speed information associated with each of a plurality of wireless networks. In one example, providing the user interface includes displaying a user interface that includes an icon representing the detected signal strength and text representing the expected end-to-end data speed for each of the plurality of wireless networks, the text indicating a discrete data speed level for each of the plurality of wireless networks.

In one example, providing the user interface includes displaying a user interface that includes an icon representing the detected signal strength and text representing different determined discrete video resolution levels associated with the expected end-to-end data speed for each of the plurality of wireless networks.

In one example, obtaining, by the wireless device from the remote network quality server, wireless network end-to-end data speed information associated with each of a plurality of wireless networks includes sending a request for a scan list to the remote network quality server as part of a WiFi scan operation and receiving a response to the scan list request. The response to the scan list request includes the wireless network end-to-end data speed information that was historically compiled from prior connections with the plurality of wireless networks.

In another example, providing the user interface includes displaying a user interface that includes an icon representing the detected signal strength and a scale indicator representing the determined discrete level of expected end-to-end data speed for each of the plurality of wireless networks.

A wireless device for providing a speed of a plurality of wireless networks is disclosed that includes a wireless interface and a controller, operatively coupled to the wireless interface. The controller configured to detect a current signal strength of each of the plurality of wireless networks and determine a discrete level of expected end-to-end data speed for each of the plurality of wireless networks using wireless network end-to-end data speed information that was historically compiled from prior connections with the plurality of wireless networks and using the detected current signal strength of each of the plurality of wireless networks. The controller is also operative to provide a user interface that includes the determined expected end-to end data speed and the detected signal strength indication of each of the plurality of wireless networks.

In one example, the controller is operative to obtain from a remote network quality server, the wireless network end-to-end data speed information associated with each of a plurality of wireless networks, prior to connecting to one or more of the plurality of wireless networks. In one example the controller is operative to provide the user interface by displaying a user interface that includes the icon representing the detected signal strength and text representing the expected end-to-end data speed for each of the plurality of wireless networks, the text indicating a discrete data speed level for each of the plurality of wireless networks.

In one example, the controller is operative to provide the user interface by displaying a user interface that includes an icon representing the detected signal strength and text representing different determined discrete video resolution levels associated with the expected end-to-end data speed for each of the plurality of wireless networks.

In one example, the controller is operative to obtain the wireless network end-to-end data speed information associated with each of a plurality of wireless networks by sending a request for a scan list to the remote network quality server as part of a wireless network scan operation and receive a response to the scan list request that includes the wireless network end-to-end data speed information that was historically compiled from prior connections with the plurality of wireless networks.

In another example, the controller is operative to provide the user interface by displaying a user interface that includes an icon representing the detected signal strength and a scale indicator representing a determined discrete level of expected end-to-end data speed for each of the plurality of wireless networks.

In one example, a server includes a network interface and a controller, operatively coupled to the network interface. The server is operative to create records of wireless network end-to-end data speed information from prior end-to-end connections between at least one wireless device and a plurality of wireless networks. The server is operative to receive a request for a scan list from the wireless device as part of a wireless network scan operation wherein the scan list identifies particular wireless networks. The server is configured to send a response to the scan list request that includes the wireless network end-to-end data speed information that was historically compiled from prior connections with the plurality of specified wireless networks that are identified by the scan list.

In one example, the controller is operative to create records of wireless network end-to-end data speed data and corresponding signal strength data for prior end-to-end connections between multiple wireless devices that had prior connections to the specified wireless networks in the scan list.

In one example, a wireless device, for providing a speed of a plurality of wireless networks is operative to detect a current signal strength of each of a plurality of wireless access points. The wireless device determines a discrete level of expected end-to-end data speed for each of the plurality of wireless access points using wireless access point end-to-end data speed information that was historically compiled from prior wireless device connections with the plurality of wireless access points and using the detected current signal strength of each of the plurality of wireless access points. The wireless device is operative to provide a user interface that includes the determined discrete level of expected end-to-end data speed and the detected signal strength indication of each of the plurality of wireless access points.

In one example, the wireless device is operative to obtain from a remote network quality server, the wireless access point end-to-end data speed information associated with each of a plurality of wireless access points. The wireless device in one example caches the obtained end to end data speed information and uses it for subsequent evaluations. In one example, the wireless device provides the user interface by displaying a user interface that includes an icon representing the detected signal strength and text representing the determined discrete level of expected end-to-end data speed for each of the plurality of WAPs. In another example, the wireless device provides the user interface by displaying a user interface that includes an icon representing the detected signal strength and text representing different determined discrete video resolution levels associated with the expected end-to-end data speed for each of the plurality of WAPs.

DETAILED DESCRIPTION OF EMBODIMENTS

Example embodiments provide one or more technical solutions that address one or more of the above problems, and/or other problems, by providing not only signal strength information for a plurality of wireless networks that a wireless device can connect to, but also by providing expected end-to-end data speeds for each of a plurality of available networks. In other embodiments, a wireless device selects (automatically or in response to user input) a desired wireless network by detecting a current signal strength of each of the plurality of wireless networks and determining an expected end-to-end data speed for each of the plurality of wireless networks. In one example this is done using historical wireless network end-to-end data speed information, which in one example includes end to end data speed information at corresponding prior signal strength levels that was historically compiled from prior connections with the plurality of wireless networks at recorded signal strength levels for each of the plurality of wireless networks. The wireless network with the highest expected end-to-end data speed is chosen. The expected end-to-end data speeds are based on historical end-to-end data speeds as experienced by the current device and/or other devices using the respective network. A wireless device also provides an improved user interface with improved iconography that provides, in one example, information identifying an expected end-to-end data speed for each of a plurality of wireless networks along with corresponding current signal strength so that a user or device can more quickly identify a best wireless network to connect to prior to connecting to a wireless network for carrying out a communication session with an end device such as a content server. In one example, ordinal (increasing, discrete (step-wise) and standard (not relative) levels of expected end-to-end data speeds are also provided.

FIG. 1 illustrates one example of a communication system 100 that includes a plurality of available wireless networks 102 and 104 that are available to a wireless device 106. The wireless networks 102 and 104 may be any suitable wireless networks including, but not limited to, differing cellular networks, differing wireless access points such as WiFi access points that are in communication with one or more other networks 108 such as the internet, other wireless wide area networks (WWAN) networks or other wireless local area networks (WLAN) networks. If desired, the communication system 100 may also include one or more related wireless devices 110 that the same user of wireless device 106 is authorized to use, such as a tablet, wearable or other wireless device. The communication system 100 also includes one or more content servers 112 such as one or more web servers that provide desired content to the wireless device 106 through the one or more wireless networks 102 and 104 when a connection exists between the wireless device and the content server 112.

The communication system 100 also includes a network quality server 114 which also includes in this example, a historical wireless network end-to-end network quality database 116. The network quality server 114 includes a network interface 118 such as any suitable wired or wireless network interface, as known in the art, that allows the network quality server 114 to communicate with the wireless device 106. The network quality server 114 also includes a controller 120 which in this example is a suitably programmed processor or processors and associated memory wherein the memory stores the historical wireless network end-to-end network quality database 116. However, any suitable structure may be employed including, but not limited to, field programmable gate arrays, state machines, application specific integrated circuits, or any other suitable structure. The associated memory may be any suitable memory including RAM, ROM, or other suitable memory that stores data in any suitable format and/or that stores executable instructions that when executed, cause the controller to operate as described herein as well as the historical wireless network end-to-end network quality database 116.

The wireless device 106 may be any suitable wireless device including, but not limited to, a smart phone, tablet, wearable device, desktop, game console, set top box, or any other suitable wireless device. The wireless networks 102 and 104 as noted above may be cellular networks including GSM networks, LTE networks, or other suitable WWAN networks or any suitable WLAN that employs wireless access point that wirelessly communicates with the wireless device 106 such as WiFi wireless access points, Bluetooth access points or any other suitable wireless network components. The wireless device 106 provides end-to-end wireless network speed indication and current signal strength information associated with the plurality of wireless networks 102 and 104 as further described below.

Figure 2:
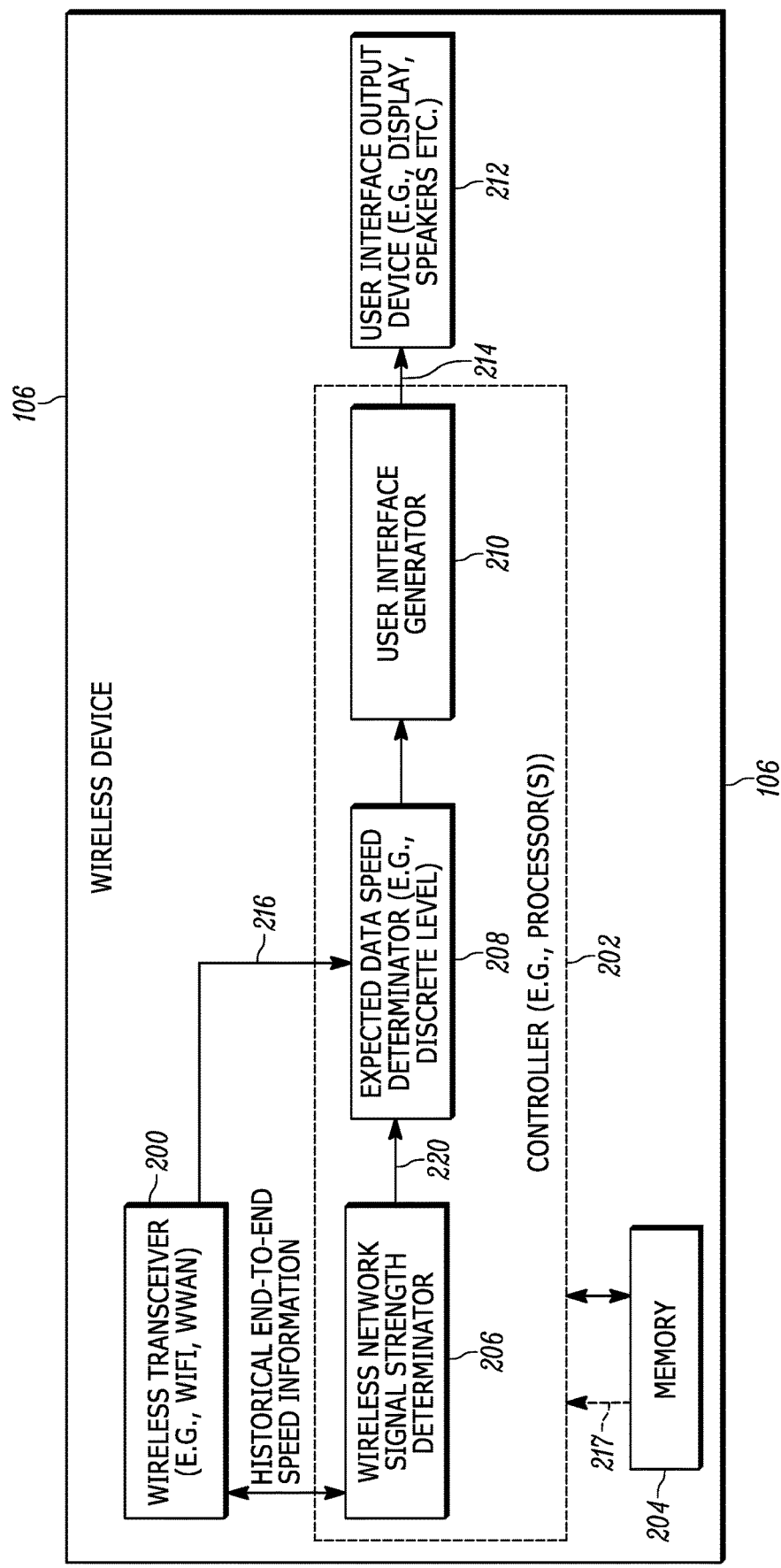
FIG. 2 is a block diagram illustrating a wireless device in accordance with one example set forth in the disclosure.

FIG. 2 illustrates one example of the wireless device 106 that includes a wireless interface 200 such as a wireless transceiver that facilitates wireless communication with the wireless networks 102 and 104 and if desired the networks 108. The wireless interface 200 in one example includes both WLAN and WWAN communication capabilities. However, any suitable wireless transceiver may be employed. The wireless device 106 also includes a controller 202 such as one or more suitably programmed processors, field programmable gate arrays, application specific integrated circuits, state machines, or any other suitable logic configured to carry out the operations described herein. In this example, the wireless device 106 also includes memory 204 that stores executable instructions that when executed by the controller 202 causes the controller 202 to operate as described herein. The controller 202 executes instructions configured as an operating system, app, or any other suitable configuration that serves as a wireless network signal strength determinator 206, expected end-to-end data speed determinator 208 and a user interface generator 210. The wireless device 106 also includes one or more user interface output devices 212 such as one or more displays, speakers, or any other suitable user interface output device that provides a user interface 214 as further described herein.

Figure 3:
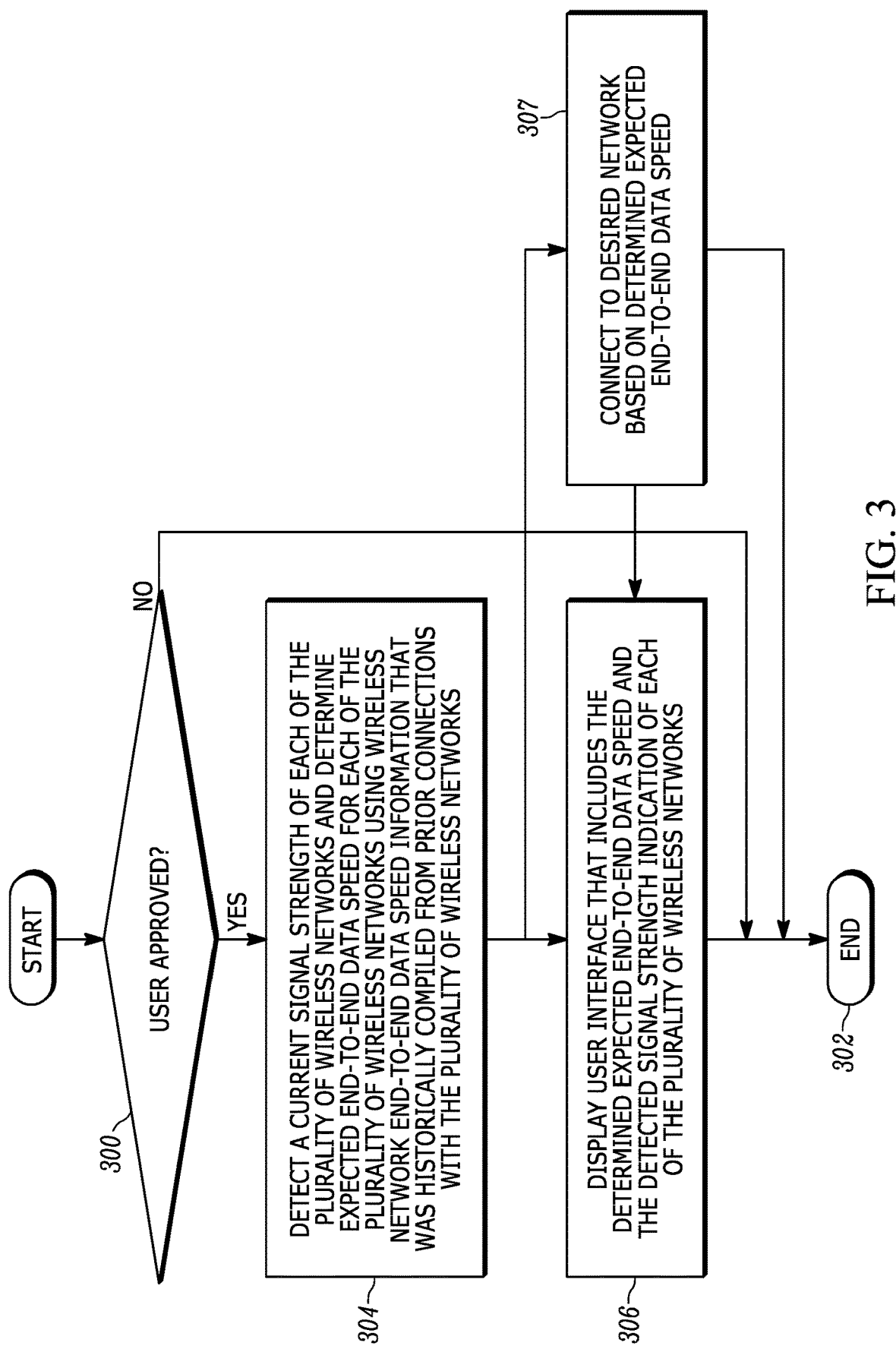
FIG. 3 is a flowchart illustrating a method for providing a speed of a plurality of wireless networks in accordance with one example set forth in the disclosure.

Referring also to FIG. 3, a method for providing a speed of a plurality of wireless networks will be described with reference to the wireless device 106. As shown in block 300, a suitable user interface is provided to a user through an operating system, settings application or any other suitable mechanism to allow a user to approve or authorize operations set forth herein. This may be done through a suitable graphic user interface button, through audible authorization, through biometrics or through any other activation mechanism as desired. If the user does not approve, the process ends as shown in block 302. However, if the user approves, as shown in block 304, the method includes the controller 202 detecting a current signal strength of each of the plurality of available wireless networks 102 and 104. For purposes of discussion, and not limitation, the wireless networks 102 and 104 will be considered WiFi networks with wireless access points. However, the techniques described herein may also be suitably applicable to other networks such as cellular networks. The current signal strength of each of the plurality of wireless networks 102 and 104 is obtained using conventional signal strength detection techniques as known in the art. This process is carried out by the controller 202 as part of a scanning process using the wireless transceiver 200. The controller 202 also determines an expected end-to-end data speed for each of the plurality of wireless networks 102 and 104. This is done using wireless network end-to-end data speed information 216 that was historically compiled from prior connections with the plurality of wireless networks 102 and 104 and also using the detected current signal strength of each of the plurality of wireless networks as further described below. In one example the detected current signal strength is used as an index to determine (e.g., look up) what a historical end-to-end data speed was at that corresponding signal strength level.

The plurality of wireless client devices collect quality parameters from the plurality of wireless networks 102, 104, which the plurality of client devices has available while they travel around various geographic locations. The quality parameters collected by the plurality of client devices are then transferred to the server 114, which analyzes the quality parameters to build a database of summarized quality parameters in each geographic location. The server 114 then shares this database with each individual client device.

The quality parameters may include only a single parameter or a multitude of parameters. For instance, the quality parameters may include at least one of a bit error rate, a signal strength such as a received signal strength indicator (RSSI), a network latency as determined by the time it takes from an HTTP request to an HTTP response, and network throughout measured in bytes/second and used to determine a time it takes to transmit a known amount of data packets in an end-to-end connection. The wireless devices will also collect wireless network identification information utilized to uniquely identify a wireless network and an access point for that wireless network, timestamp information to identify the time the parameters were obtained and any other desired information.

In one example, the controller 202 is operative to obtain, from the remote network quality server 114, the wireless network end-to-end data speed information 216 associated with each of the plurality of wireless networks. Alternatively, the wireless network end-to-end data speed information that was historically compiled from prior connections with the plurality of wireless networks 102 and 104 may be stored locally in memory 204 as shown by dashed line 217. For example, the wireless device 106 may cache prior historical wireless network end-to-end network data speed information previously obtained from the network quality server 114 or may compile the historical wireless network end-to-end speed information instead of the network quality server 114. When cached locally, the wireless device need not contact the network quality server 114 for subsequent expected network speed evaluations and instead can use the cached expected network speed information to look up expected wireless network end-to-end speed information for subsequent network connection opportunities. This can speed up the process by removing the need to send a scan list request and process a response from the network quality server 114 each time a network connection opportunity needs evaluation. The cached information in one example includes time information that is used by the wireless device to determine whether the cached information should be updated. For example, if the cached information is considered too old based on a time threshold or other criteria, a new scan list request is sent to obtain more recent expected wireless network end-to-end speed information from the network quality server 114. The wireless network end-to-end data speed information 216 in one example is data representing a curve defined by past measured data speeds at corresponding past signal strength information as previously measured by other wireless devices when using the wireless networks 102 and 104 and/or the wireless device 106. The wireless network end-to-end data speed information 216 instead of being in the form of a graph, may be in the form of scores with corresponding signal strength data, a table or any other suitable format. As further set forth below, the current signal strength measurement, in one example, is used as a reference point to determine the corresponding past data speed on the curve. The past data speed becomes the expected end-to-end data speed for a given network.

In one example, the wireless network end-to-end data speed information provides a historical indication of performance for that wireless network for a corresponding signal strength based on the wireless network quality parameters and the location data. For instance, the wireless network quality may be based on a weighted average of the totality of throughput and latency measurements collected from the plurality of wireless client devices over time, as defined by the collected timestamp indicating a time when the wireless network quality parameters were collected. In this regard, the more recently collected quality parameters could be weighted more heavily in comparison to previously collected wireless network quality parameters in determining the wireless network quality.

Stated another way, the wireless network end-to-end data speed information is based on, for example, the speed in terms of a rate of bits per second that were measured in a prior connection session at a measured signal strength level for a number of different sessions by any prior wireless device that has agreed to participate in providing end to end measurements (e.g., speed and signal strength). As such, the scores can represent a set of speed versus signal strength measurements obtained during previous content sessions by the wireless device 106 or any other suitable device. The prior speed levels may be, for example, averaged over a thirty day period, a two week period, by time of day, weighted by type of device sending the data, weighted according to any suitable criteria or otherwise combined as desired. The wireless device 106 looks at the current signal strength indication for a particular wireless network and looks at the set of scores and pulls the score whose signal strength match the current signal strength in the terms of the speed and uses that associated speed as the expected speed. Where real time information is collected through user approval, a measurement application operating in the background may determine the data speed and particular signal strength over minutes or hours or any other suitable measurement timeframe and report them to the network quality server 114 for use in compiling average network throughput speeds per network based on multiple wireless devices.

As shown in blocks 306 and 307, once the expected end-to-end data speed for each of the plurality of wireless networks is determined, the controller 202 connects to at least one of the plurality of wireless networks based on the determined expected end-to-end data speed for each of the plurality of wireless networks and/or provides a user interface 214 for display by the user interface output device 212. The user interface 214 (see e.g., FIG. 6) includes the determined expected end-to-end data speed for each of the plurality of wireless networks in addition to the detected signal strength indication of each of the plurality of wireless networks. In one example, the controller 202 automatically connects to the wireless network with the highest determined expected end-to-end data speed. This is done by the expected data speed determinator 208 or other suitable mechanism by controlling the wireless transceiver 200 to connect with the wireless network having the highest expected end-to-end data speed. However any other suitable criteria can be used. In another example the controller connects to the wireless network selected by a user using the user interface 214. It will be recognized that any other suitable selection mechanism may also be used. Also in some embodiments both the automatic connection occurs and the user interface 214 containing the determined expected end-to-end data speed for each of the plurality of wireless networks and the detected signal strength indication is used so that the wireless device or user can select a different wireless network if desired. In some embodiments, the user interface 214 is provided prior to a connection being made with the network.

Figure 4:
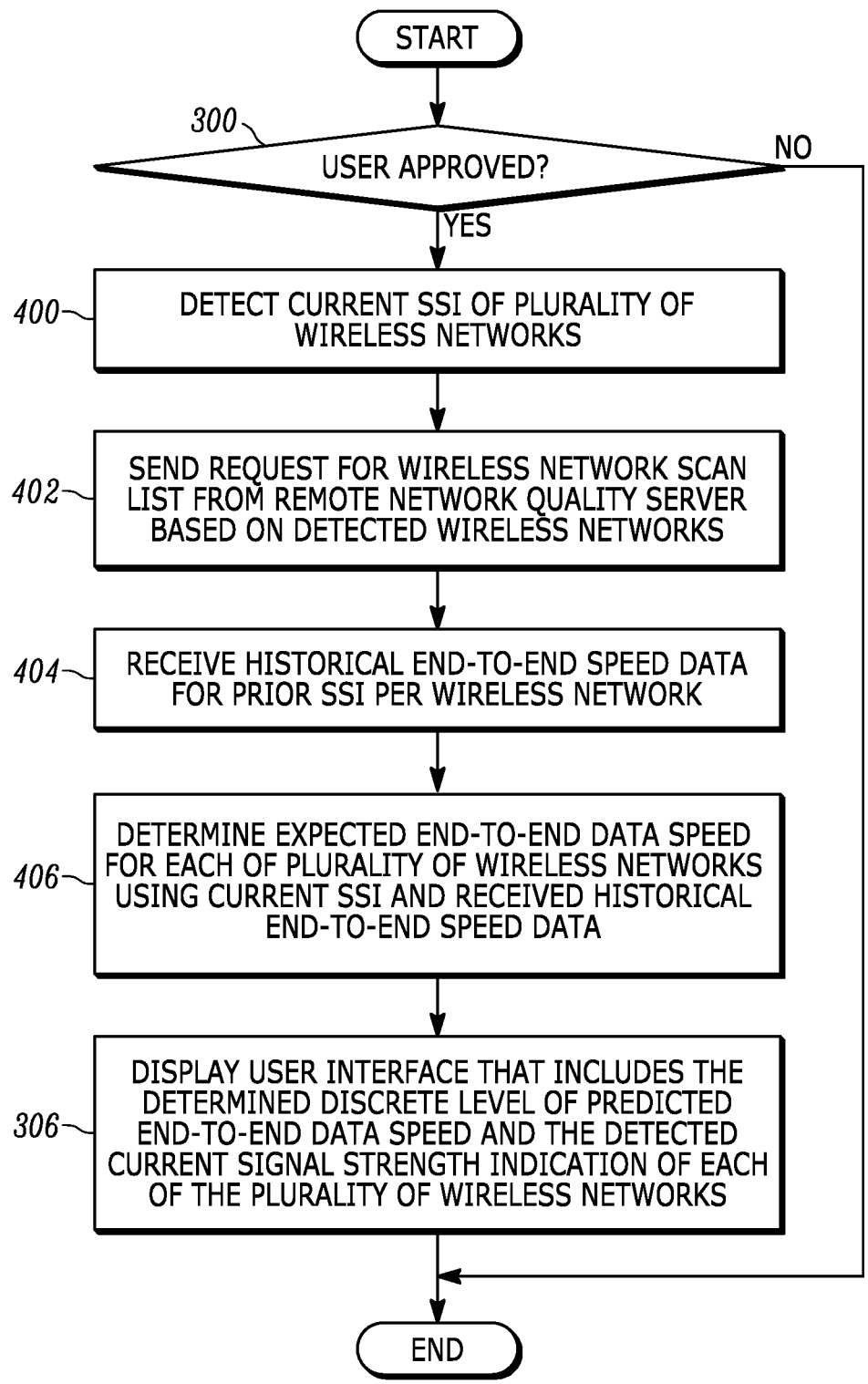
FIG. 4 is a flowchart illustrating a method for providing a speed of a plurality of wireless networks in accordance with one example set forth in the disclosure.

Referring to FIGS. 2 and 4, a more detailed methodology carried out by the wireless device 106 is shown. As shown in block 400, the method includes detecting a current signal strength indication of each of the plurality of wireless networks 102 and 104 which is done by the wireless network signal strength determinator 206 using the wireless transceiver 200. This process is done using known techniques to obtain the current signal strength of, for example, each of the multiple WAPs that are available to the wireless device 106. The determined current signal strength information 220 is provided to the expected end-to-end data speed determinator 208. As shown in block 402, the method includes sending, by the controller 202 of the wireless device 106, a request 222 for a network scan list from the remote network quality server 114 based on the detected wireless networks 102 and 104. The scan list, in one example, includes the network identification information for each of the discovered wireless networks 102 and 104 such as SSID (Service Set Identifier) and BSSID (Basic Service Set Identifier) information along with any other necessary data for the network quality server 114 to obtain historically compiled end-to-end speed information for each of the detected wireless networks. This additional information in one example includes metadata or other data that identifies the wireless device 106 requesting the information so that if desired historical end-to-end speed information for similar models of devices are used. If desired, the scan list request may include a requested speed so that the response only provided network IDs that use the bandwidth requested. However any suitable information can be employed. In one example, the request 222 for the network scan list is sent using a WWAN connection, however any suitable communication path may also be employed.

The network quality server 114 receives the scan list request 222 and uses it to look up prior compiled end-to-end speed information that has been historically compiled from prior end-to-end connections with each of the wireless networks 102 and 104 identified by the scan list. The prior information in one example was previously provided by the wireless device 106 and/or other wireless devices which measured the end-to-end data speed using known techniques during prior connection sessions, as authorized by the user of the various devices. As such, the system can continue to update the historical information each time a connection session is made, or periodically as desired as approved by the user of the device. By way of example, if approved by a user or provider of an application or website, an application that provides the historical information can provide an application identifier, content identifier such as a web site URL or other identifier of the content source (e.g., a site that provides videos) to the server 114 so that historical data is compiled on an application level, website type level (those that provide videos) or actual website level, or other suitable level so that when a scan list request is issued, the returned wireless network end-to-end speed information is based on the respective identifier so that the returned speed information is specific to that type of content source, URL, application or application type (e.g., social media, video, messaging etc.). Other techniques may also be employed if desired. The network quality server 114 sends the reply to the request that includes the wireless network end-to-end data speed information 216 that is historically compiled from prior connections with the plurality of wireless networks.

As shown in block 404, the wireless device 106 receives the historical end-to-end data speed information 216 on a per-wireless network basis from the network quality server 114. As shown in block 406, the expected end-to-end data speed determinator 208, determines an expected end-to-end data speed for each of the plurality of wireless networks 102 and 104 using the current signal strength indication information 220 for each of the networks 102 and 104 and also using the received historical end-to-end speed data 216. For example, where the historical end-to-end data speed information 216 is data representing a curve (e.g., signal strength/bandwidth curve) with one axis as prior end-to-end data speed (e.g., Mb/s) and another axis as prior signal strength at the corresponding prior speed for a given network SSID/BSSID, the expected end-to-end data speed determinator 208 uses the current measured signal strength (or RSSI) for the same network to look up the prior data speed from the curve corresponding to the signal strength. The data speed from the curve is used as the expected end-to-end data speed for the particular wireless network. The end-to-end data speeds in the curve in one example represent groupings of prior measured end-to-end measurements such as an average of data speeds that fall within a desired range.

Once the expected end-to-end data speed determinator 208 determines the expected end-to-end data speed for each of the wireless networks using the wireless network end-to-end data speed information 216 using the detected current signal strength of each of the plurality of networks from block 400, the user interface generator 210 creates a user interface 214, in one example, a graphics user interface, that includes an icon representing the detected signal strength and text representing the expected end-to-end data speed for each of the plurality of wireless networks. In one example, the text indicates a discrete data speed level for each of the plurality of wireless networks as shown, for example, in FIG. 6. For example the determined expected end-to-end data speed may be one of four different speed levels depending on which speed the historical wireless end-to-end data speed indicated that the network should function at based on the current signal strength. For example each level (e.g., "Fast" or "Very Fast") may be defined by a different range (5-10 Mbps-25 Mbps or higher) of historical wireless end-to-end data speeds.

Figure 5:
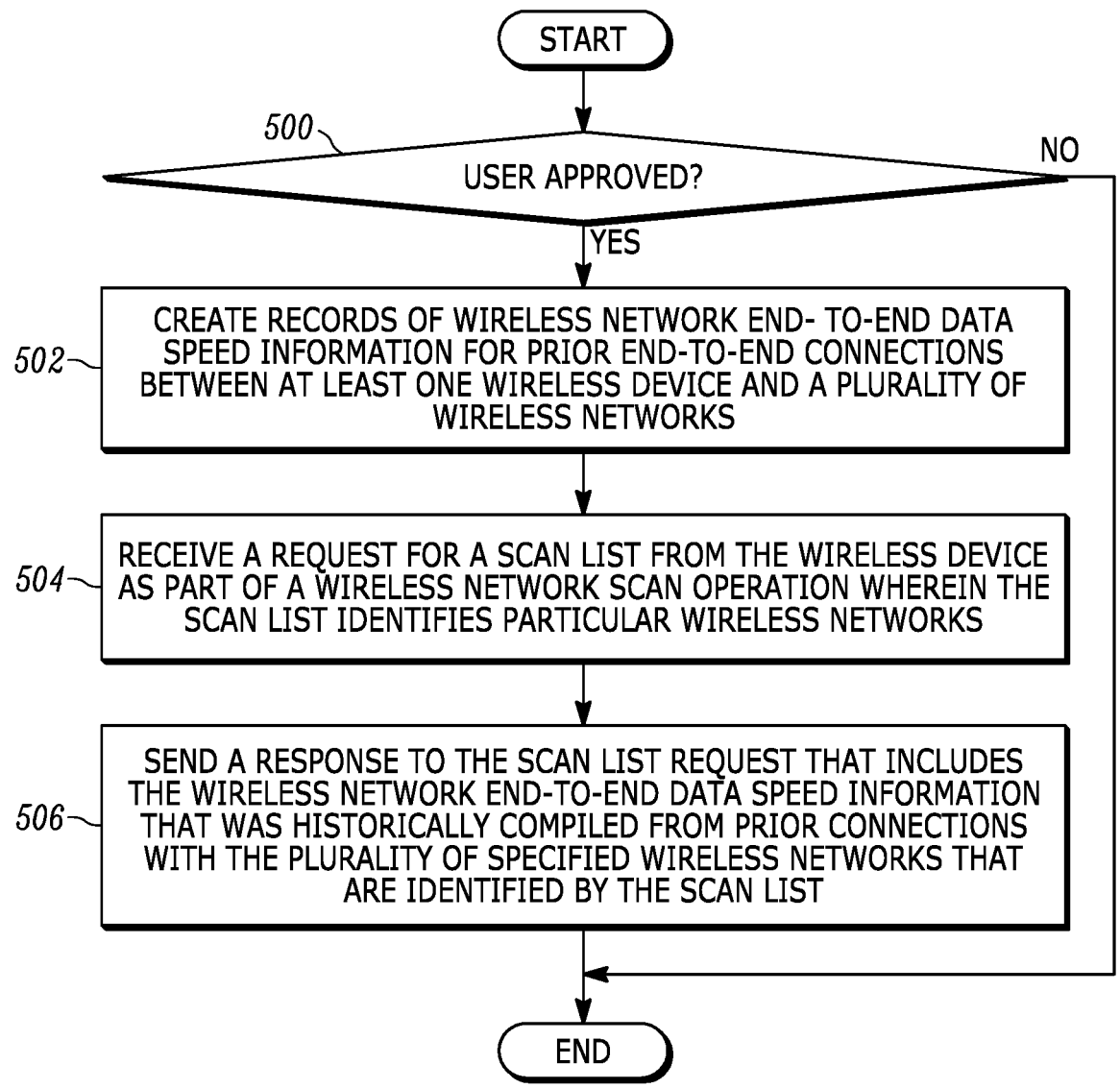
FIG. 5 is a flowchart illustrating a method of operation of a server in accordance with one example set forth in the disclosure.

FIG. 5 is a flowchart illustrating one example of a method carried out by a server, such as the network quality server 114. As shown in block 500, the network quality server 114 will not provide historical wireless end-to-end data speed information that was historically compiled from prior connections with the plurality of wireless networks if it is not authorized. If a user approves use of the process, the method includes, as shown in block 502, creating database records of wireless network end-to-end data speed information and corresponding signal strength data that is recorded when recording the data speed, for prior end-to-end connections by wireless devices and each of the plurality of wireless networks. A database record may include data representing, for example, network identification information for each of the networks whose quality is being measured (e.g., SSID and BSSID information). In one example, the database record also includes the measured data speed and its corresponding signal strength that has been measured while detecting the data speed.

As shown in block 504, the network quality server 114 receives the request 222 for a scan list from the wireless device 106 as part of a wireless network scan operation carried out by the wireless device 106. The request 222 for the scan list identifies particular wireless networks and may include a device identifier or any other identification information necessary to pull the appropriate prior network end-to-end data speed information. In one example, the request 222 includes (time of day, SSID, Access Point MAC address, current signal strength). As shown in block 506, the network quality server 114 locates the records and sends a response to the scan list request that includes the wireless network end-to-end data speed information 216 that was historically compiled by the network quality server from prior connections with the plurality of specified wireless networks that are identified by the scan list. In one example the response includes (MAC, expected bandwidth) for the requested time of day. However it will be recognized that time of day information need not be employed and other data may be used. In one example, the scan list request is represented by SSID/BSSID pairs, current signal strength and the response includes SSID/BSSID pairs, score curve of RSSI v. bandwidth. The wireless device 106 then uses the wireless network end-to-end data speed information 216 as previously described.

Figure 6:
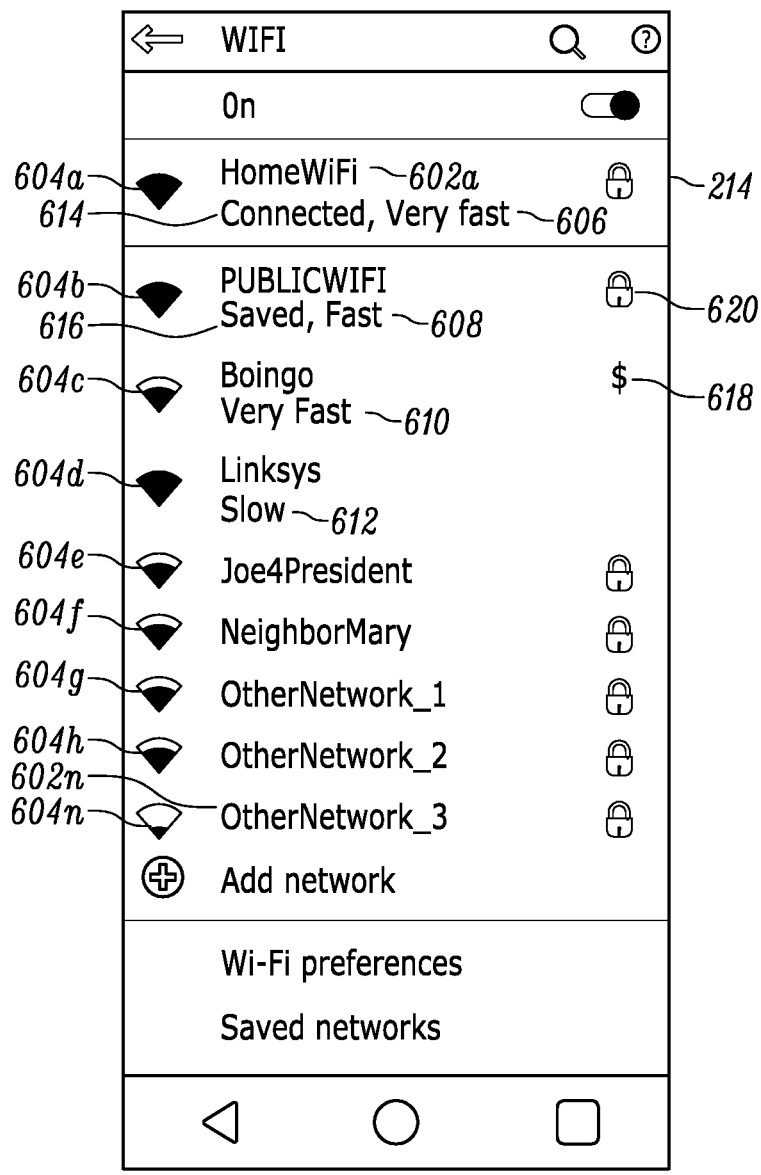
FIG. 6 graphically illustrates a user interface in accordance with one example set forth in the disclosure.

Referring to FIG. 6, one example of the user interface 214 output by user interface output device 212 is shown to include WAP identifiers 602a-602n that have been identified as being within range of the wireless device 106 using conventional wireless network scanning techniques. Also illustrated are icons 604a-604n that represent the detected current signal strength of each respective wireless network, in this example a wireless access point of a WiFi network. Also presented in the user interface is text representing the expected end-to-end data speed 606, 608, 610, 612 for each of the plurality of wireless networks as determined by the wireless device 106. The text indicates an expected discrete data speed level for each of the plurality of wireless networks. In this example, the discrete levels are "very fast", "fast" and "slow". Additional text 614 illustrates whether the WAP is already connected, data 616 indicates whether a public WiFi has previously been saved as being trusted, other icons 618 indicate whether a fee is charged to connect with a wireless access point and icon 620 illustrates whether a password is required to logon to the wireless access point. In this example, the wireless device is auto connected to the "HomeWiFi" network and the user interface allows user selection of differing wireless networks. The discrete data speed levels 606, 608, 610 and 612 are based on, in one example, standard thresholds such 0-1 Mbps (too slow for streaming music), "OK" 1-5 Mbps (for streaming music and SD video), "Fast" 5-25 Mbps (suitable for streaming HD video) and "Very Fast" 25+ Mbps (suitable for 4K video). However any suitable data speed levels can be employed. Having discrete expected speed levels presented in a graphic user interface in addition to current signal strength allows a user to quickly identify those wireless access points that although have a lower signal strength, have a faster data rate and therefore are more suitable for a particular application being executed. The discrete expected end-to-end data speed levels may already be set by the network quality server 114 or the network quality server 114 may provide prior speeds which are then averaged by the wireless device and compared to the standard threshold which is selected based on the average speed of the prior measurements over a period of time (combining locally measured data from the wireless device with server side data). In an example, the server side data from the network quality server 114 changes on the order of days (that is, about once a day), but the local data obtained by the wireless device can change moment to moment. The local data is used to adjust the received server side data to form a blended average. As shown, for example, the signal strength icon or indicator is presented along with text indicating the expected end-to-end data speed based on wireless network end-to-end speed information that was historically compiled from prior connections.

Figure 7:
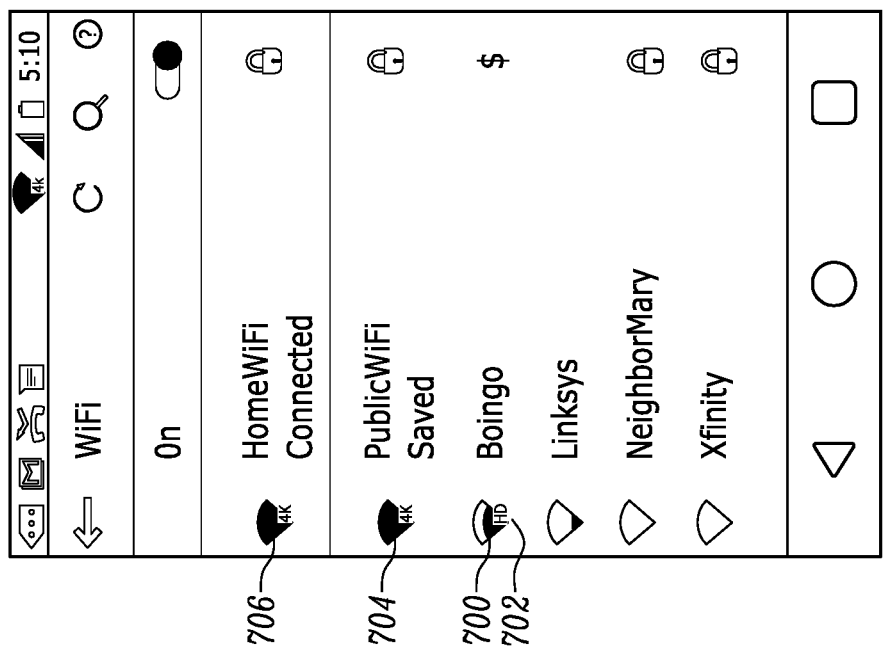
FIG. 7 graphically illustrates a user interface in accordance with one example set forth in the disclosure.

FIG. 7 illustrates another example of signal strength icons 700, 704 and 706 for wireless networks that are badged with text representing different determined discrete video resolution levels associated with the expected end-to-end data speed for each of the plurality of wireless networks. In this example, "video-badging" denotes the speed and capabilities of a network. For example, badging a signal strength network icon as "LD" means low definition video speed capability is expected, badging a signal strength icon with "SD" means standard definition video expected end-to-end data speeds, "HD" means high definition video resolution level is expected and "4k" means high definition resolution capability is expected for a given network that will support 4k video speed. The text 702 in this example is "HD". This enables users to understand the speed and capability of the WiFi network available for them at a glance. Video thresholds needed to support a video at a given resolution are relatively well defined. For example, HD video streaming generally requires about 5 megabits per second of bandwidth. Also, the video badging is ordinal (increasing), discrete (step wise) and is recognizable by users. The badging, like the text 608 in FIG. 6 representing expected end-to-end data speeds is based on historical data and can be updated with real time data once a connection is made. As such, initially historical data is used and over time, the expected end-to-end data speed is updated based on local performance on the wireless device to take into account device variance and performance and local congestion on the network. Icon 704 can replace, for example, the icon 604a and text 606 from FIG. 6 can be replaced by the icon and badge combinations shown in FIG. 7 as 704 and 706 as another way of presenting expected end-to-end data speed for each of the plurality wireless networks along with current signal strength information.

Figure 8:
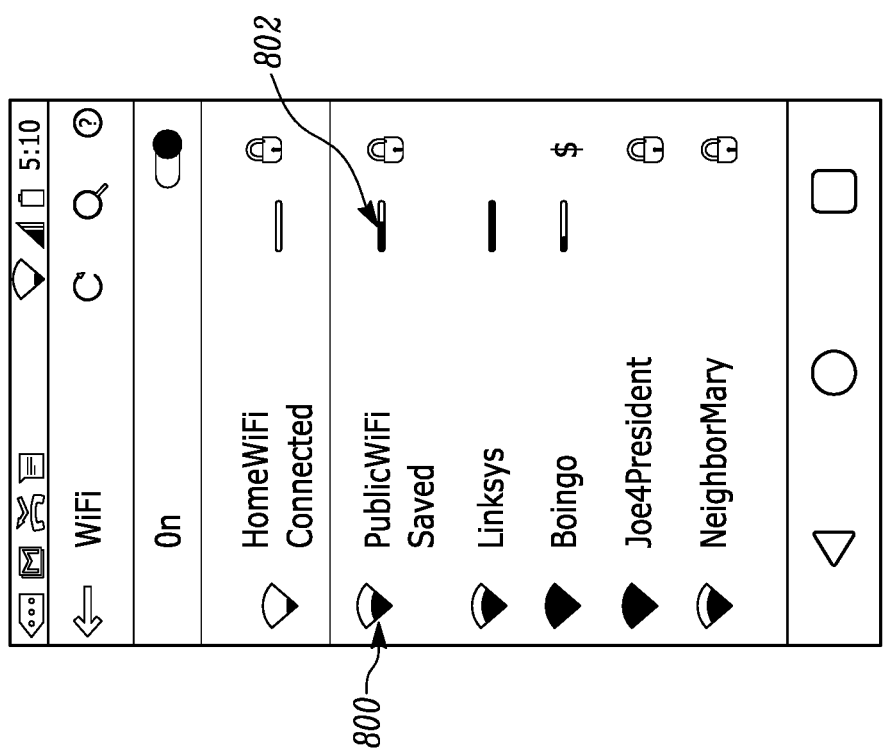
FIG. 8. graphically illustrates a user interface in accordance with one example set forth in the disclosure.

FIG. 8 illustrates another user interface example where the signal strength icon 800 is not badged but instead a series of continuous bar indicators 802 are placed away from the icons 800 for a more visually, cleaner approach. A lock icon is also in the same row. The order of the WAPs is shown as saved, then fastest, then signal strength. However any suitable order may be used. It will be recognized that colors or other icons may also be used for any other interface shown in the various figures herein.

Figure 9:
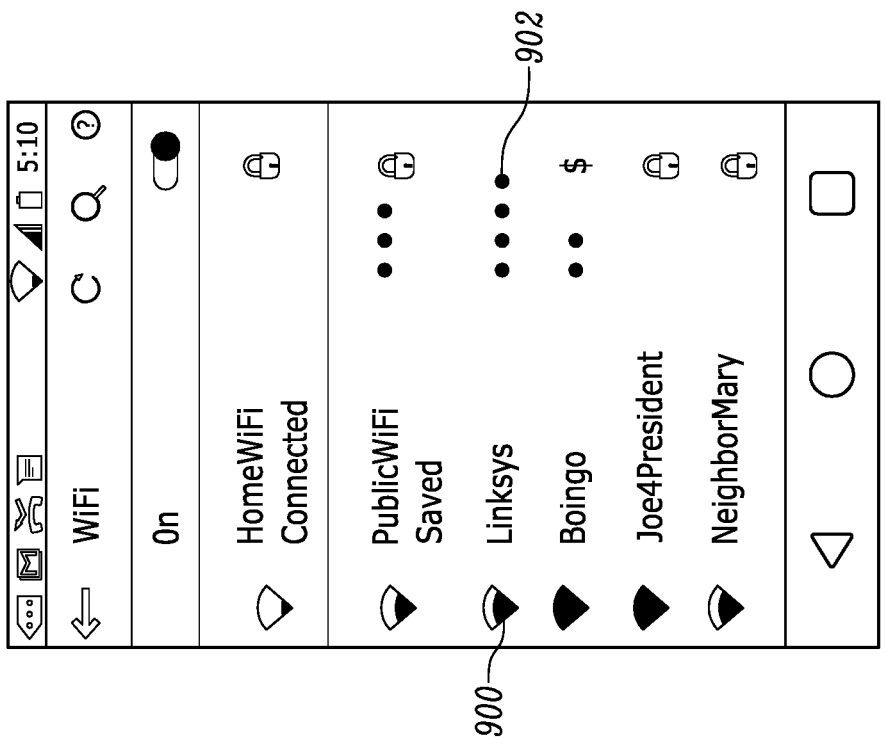
FIG. 9 graphically illustrates a user interface in accordance with one example set forth in the disclosure.

FIG. 9 illustrates another user interface example where the signal strength icon 900 is not badged but instead the determined expected end-to-end data speed is illustrated as a series of discrete dots as a dot indicator that is placed away from the icon as shown as 902 for a more visually, cleaner approach. A lock icon is also in the same row. The order of the WAPs is shown as saved, then fastest, then signal strength. However any suitable order may be used. It will be recognized that colors or other icons may also be used for any other interface shown in the various figures herein.

Figure 10:
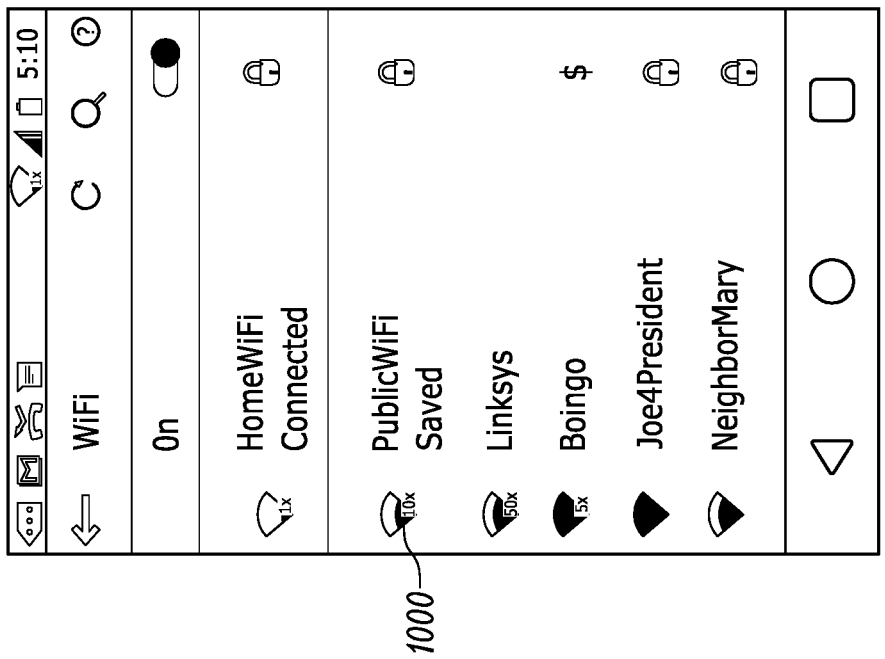
FIG. 10 graphically illustrates a portion of a user interface in accordance with one example set forth in the disclosure.

FIG. 10 is another example where the signal strength icon is badged by text representing expected end-to-end data speed levels as shown by icon 1000 with a badge of "10×" shown as the expected speed level. Other icons show expected speeds of 50× and 5×.

Figure 11:
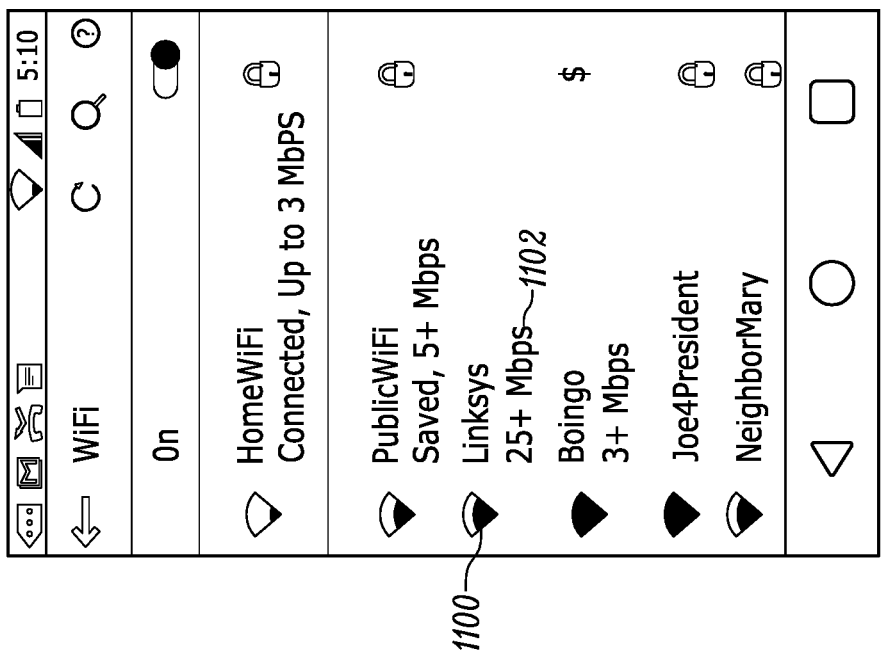
FIG. 11 graphically illustrates a user interface in accordance with one example set forth in the disclosure.

FIG. 11 illustrates another example where an icon 1100 illustrates the current signal strength of a wireless network with text 1102 representing discrete expected end-to-end data speed levels for each of the plurality of detected wireless networks. In this example, the top five networks are represented in the order of connected, saved, fastest and best signal strength. However, any suitable order may be used.

Figure 12:
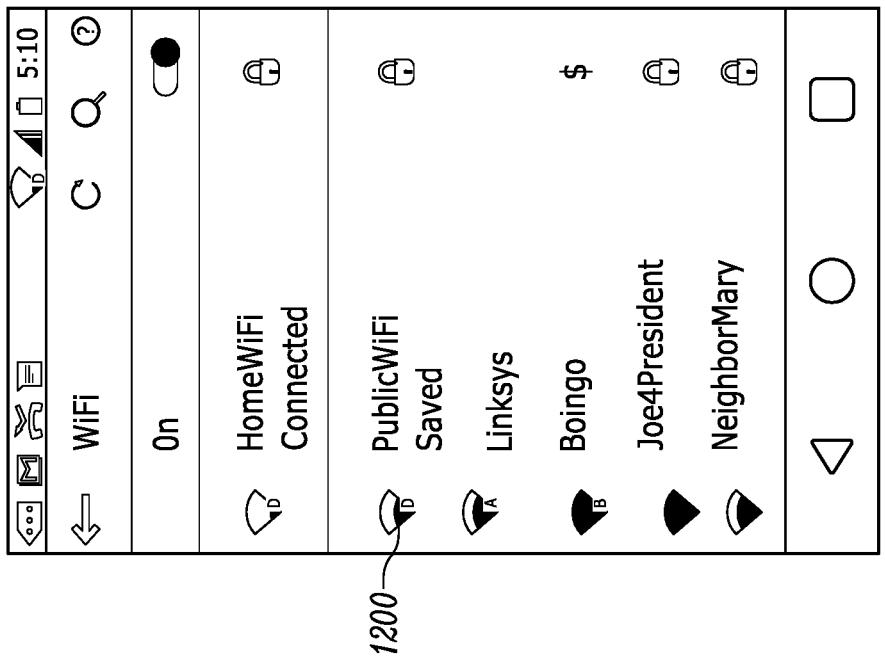
FIG. 12 graphically illustrates a user interface in accordance with one example set forth in the disclosure.

FIG. 12 is another example where the signal strength icon 1200 is badged by text representing expected end-to-end data speed levels with a badge of differing letters C, A and B shown as the expected speed levels for differing networks.

Figure 13:
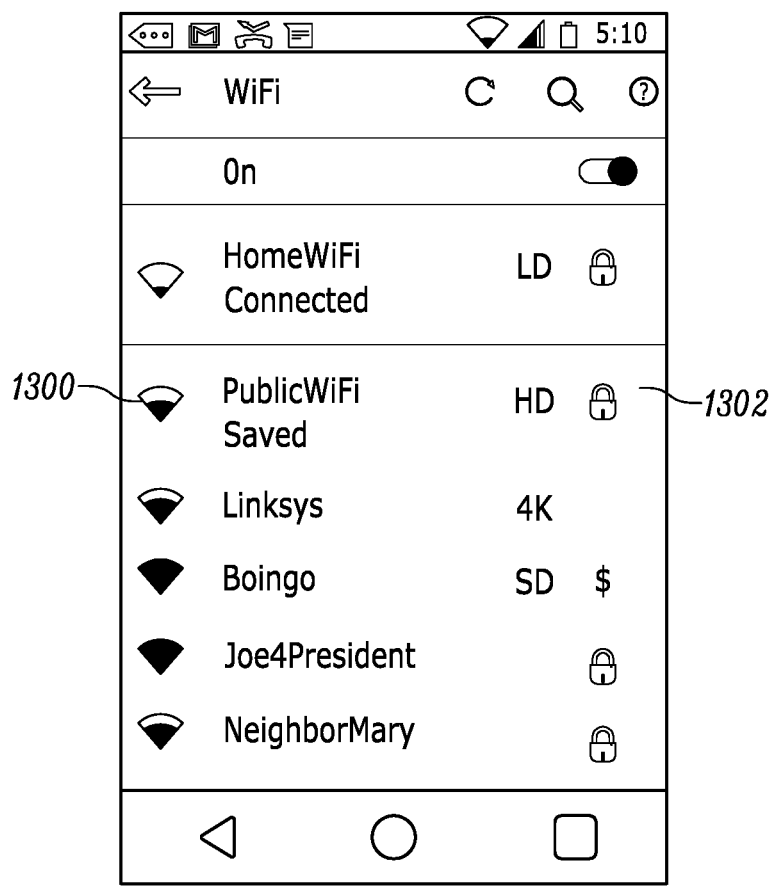
FIG. 13 graphically illustrates a user interface in accordance with one example set forth in the disclosure.

FIG. 13 is another example where the signal strength icon 1300 is not badged but text representing expected end-to-end data speed levels is shown as video resolution levels like those shown in FIG. 7 in a same row but away from the icon.

Figure 14:
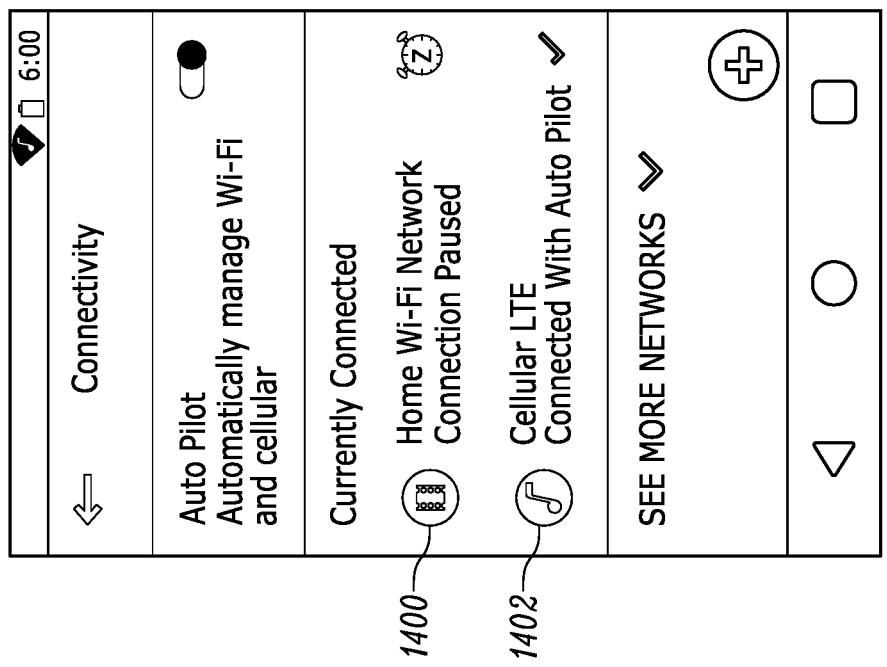
FIG. 14 graphically illustrates a user interface in accordance with one example set forth in the disclosure.

FIG. 14 is another example where the signal strength icon 1400 is also configured to represent expected end-to-end data speed levels with an in image representing video resolution levels. In this example icon 1400 shows a film image depicting movie speed capability whereas icon 1402 illustrates a note image showing music speed capability which is a slower expected speed.

Figure 15:
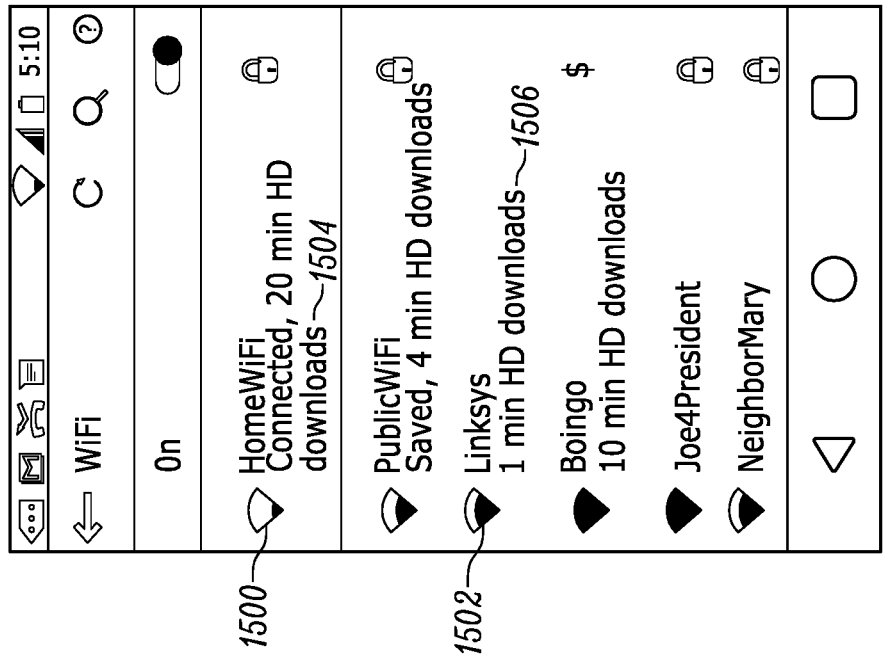
FIG. 15 graphically illustrates a user interface in accordance with one example set forth in the disclosure.

FIG. 15 is another example user interface with icons 1500 and 1502 that represent the detected current signal strength of each respective wireless network and text 1504 and 1506 representing the expected end-to-end data speed for each of a plurality of wireless networks "HomeWiFi" and "Linksys" as determined by the wireless device 106. The text indicates a discrete data speed level for each of the plurality of wireless networks. In this example, the discrete levels are an expected amount of time that it would take to download a high definition "HD" movie. In this example, it is expected that it would take 20 minutes to download a typical HD movie using the "HomeWiFi" network.

Referring back to FIG. 2 and FIGS. 7, 10 and 12 in a WAP example, the wireless device 106 determines a current signal strength for a given wireless access point and uses the received wireless network end-to-end data speed information which may be a set of scores over differing connection sessions, to determine an expected end-to-end data speed corresponding to the current signal strength as measured by the wireless device 106. The wireless device 106 then creates a user interface 214 which includes a signal strength icon for the current signal strength and labels the signal strength icon (also referred to as badging the icon) with one of the plurality of different expected end-to-end network signal speed levels. The network signal end-to-end speed levels can be discrete level labels that are presented to a user in the form of a graphic icon, audibly or in any other suitable manner.

As noted above, the end-to-end speed information whether historical or real time takes into account an entire network connection as opposed to, for example, only the data speed of a particular wireless access point. Also, in some embodiments, the network quality server sends speed information that includes data representing both historical end-to-end data speed and corresponding signal strength data. In some embodiments a user interface is proved that includes the determined expected end-to-end data speed and the detected signal strength indication of each of the plurality of wireless networks. The user interface examples provided herein do not overload existing indicators such as the signal strength wedge indicator or icon.

In situations in which the systems and methods discussed herein may collect personal information about users, or may make use of personal information (e.g., user data), users are provided with one or more opportunities to control how information is collected about the user and used in one or more described features. A user is provided with control over whether programs or features collect user data (e.g., information about a user's social network, user characteristics (age, gender, profession, etc.), social actions or activities, a user's preferences, content created or submitted by a user, a user's current geographic location, etc.). A user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more control options over a communication network. In addition, certain data may be treated in one or more ways before it is stored or used, so that personally identifiable information is removed. For example, a user's identity may be treated so that no personally identifiable information can be determined for the user, or a user's geographic location may be generalized to a larger region so that a particular location of a user cannot be determined.

The above detailed description and the examples described therein have been presented for the purposes of illustration and description only and not for limitation. For example, the operations described may be done in any suitable manner. The methods may be done in any suitable order still providing the described operation and results. It is therefore contemplated that the present embodiments cover any and all modifications, variations or equivalents that fall within the spirit and scope of the basic underlying principles disclosed above and claimed herein.

What is claimed is:

1. A method carried out by a wireless device, the method comprising:
    detecting, by the wireless device, a current signal strength of each of a plurality of wireless networks;
    for each wireless network of the plurality of wireless networks, determining, by the wireless device, an expected end-to-end data speed for the corresponding wireless network using corresponding wireless network end-to-end data speed information that was historically compiled from prior connections corresponding to previous internet sessions with the corresponding wireless network and using the detected current signal strength of the corresponding wireless network, wherein the corresponding wireless network end-to-end data speed information comprises measured end-to-end data speeds and corresponding measured signal strengths during the prior connections with the corresponding wireless network; and
    providing, by the wireless device, a user interface comprising the determined expected end-to-end data speed and the detected signal strength indication of each of the plurality of wireless networks,
    wherein the user interface comprises an icon representing the detected signal strength and text representing determined expected end-to-end discrete video resolution levels associated with the expected end-to-end data speed for each of the plurality of wireless networks.

2. The method of claim 1, further comprising:
    obtaining, by the wireless device from a remote network quality server, the corresponding wireless network end-to-end data speed information associated with each of the plurality of wireless networks; and
    connecting to at least one of the plurality of wireless networks based on the determined expected end-to-end data speed for each of the plurality of wireless networks.

3. The method of claim 1, wherein providing the user interface comprises displaying a user interface that comprises text representing the expected end-to-end data speed for each of the plurality of wireless networks, the text indicating a discrete expected end-to-end data speed level for each of the plurality of wireless networks.

4. A method carried out by a wireless device, the method comprising:
    detecting, by the wireless device, a current signal strength of each of a plurality of wireless networks;
    determining, by the wireless device, an expected end-to-end data speed for each of the plurality of wireless networks using wireless network end-to-end data speed information that was historically compiled from prior connections corresponding to previous internet sessions with the plurality of wireless networks and using the detected current signal strength of each of the plurality of wireless networks; and
    providing, by the wireless device, a user interface comprising the determined expected end-to-end data speed and the detected signal strength indication of each of the plurality of wireless networks,
    wherein providing the user interface comprises displaying a user interface that comprises an icon representing the detected signal strength and text representing determined expected end-to-end discrete video resolution levels associated with the expected end-to-end data speed for each of the plurality of wireless networks.

5. The method of claim 2, wherein obtaining the corresponding wireless network end-to-end data speed information associated with each of the plurality of wireless networks comprises:
    sending a request for a scan list to the remote network quality server as part of a WiFi scan operation; and
    receiving a response to the scan list request that comprises the corresponding wireless network end-to-end data speed information that was historically compiled from prior connections with each of the plurality of wireless networks.

6. The method of claim 1, wherein providing the user interface comprises displaying a user interface that comprises an icon representing the detected signal strength and a scale indicator representing a determined expected end-to-end discrete level of expected end-to-end data speed for each of the plurality of wireless networks.

7. A wireless device comprising:
    a wireless interface; and
    a controller, operatively coupled to the wireless interface, and configured to:
        detect a current signal strength of each of a plurality of wireless networks;
        for each wireless network of the plurality of wireless networks, determine an expected end-to-end data speed for the corresponding wireless network using corresponding wireless network end-to-end data speed information that was historically compiled from prior connections corresponding to previous internet sessions with the corresponding wireless network and using the detected current signal strength of the corresponding wireless network, wherein the corresponding wireless network end-to-end data speed information comprises measured end-to-end data speeds and corresponding measured signal strengths during the prior connections with the corresponding wireless network; and provide a user interface comprising the determined expected end-to-end data speed and the detected signal strength of each of the plurality of wireless networks by displaying an icon representing the detected signal strength and text representing determined expected end-to-end discrete video resolution levels associated with the expected end-to-end data speed for each of the plurality of wireless networks.

8. The wireless device of claim 7, wherein the controller is further configured to:

obtain from a remote network quality server, the corresponding wireless network end-to-end data speed information associated with each of the plurality of wireless networks; and connect to at least one of the plurality of wireless networks based on the determined expected end-to-end data speed for each of the plurality of wireless networks.

9. The wireless device of claim 7, wherein the controller is further configured to provide the user interface by displaying a user interface that comprises an icon text representing the expected end-to-end data speed for each of the plurality of wireless networks, the text indicating a discrete expected end-to-end data speed level for each of the plurality of wireless networks.

10. A wireless device comprising:

a wireless interface; and a controller, operatively coupled to the wireless interface, and configured to:

detect a current signal strength of each of a plurality of wireless networks;

determine an expected end-to-end data speed for each of the plurality of wireless networks using wireless network end-to-end data speed information that was historically compiled from prior connections corresponding to previous internet sessions with the plurality of wireless networks and using the detected current signal strength of each of the plurality of wireless networks; and provide a user interface comprising the determined expected end-to-end data speed and the detected signal strength indication of each of the plurality of wireless networks, wherein the controller is further configured to provide the user interface by displaying a user interface that comprises an icon representing the detected signal strength and text representing determined expected end-to-end discrete video resolution levels associated with the expected end-to-end data speed for each of the plurality of wireless networks.

11. The wireless device of claim 8, wherein the controller is further configured to obtain the corresponding wireless network end-to-end data speed information associated with each of the plurality of wireless networks by:

sending a request for a scan list to the remote network quality server as part of a wireless network scan operation; and receiving a response to the scan list request that comprises the corresponding wireless network end-to-end data speed information that was historically compiled from prior connections with each of the plurality of wireless networks.

12. The wireless device of claim 7, wherein the controller is further configured to provide the user interface by displaying a user interface that comprises an icon representing the detected signal strength and a scale indicator representing a determined expected end-to-end discrete level of expected end-to-end data speed for each of the plurality of wireless networks.

13. A method carried out by a wireless device, the method comprising:

detecting, by the wireless device, a current signal strength of each of a plurality of wireless access points;

for each wireless access point of the plurality of wireless access points, determining, by the wireless device, a discrete level of expected end-to-end data speed for the corresponding wireless access point using corresponding wireless access point end-to-end data speed information that was historically compiled from prior connections corresponding to previous internet sessions with the corresponding wireless network and using the detected current signal strength of the corresponding wireless network, wherein the corresponding wireless access point end-to-end data speed information comprises measured end-to-end data speeds and corresponding measured signal strengths during the prior connections with the corresponding wireless access point; and providing, by the wireless device, a user interface comprising the determined discrete level of expected end-to-end data speed and the detected signal strength of each of the plurality of wireless access points, wherein providing the user interface comprises displaying a user interface that comprises an icon representing the detected signal strength and text representing different determined discrete video resolution levels associated with the expected end-to-end data speed for each of the plurality of wireless access points.

14. The method of claim 13, further comprising obtaining, by the wireless device from a remote network quality server, the corresponding wireless access point end-to-end data speed information associated with each of the plurality of wireless access points.

15. The method of claim 14, wherein providing the user interface comprises displaying a user interface that text representing the determined discrete level of expected end-to-end data speed for each of the plurality of wireless access points.

16. A method carried out by a wireless device, the method comprising:

detecting, by the wireless device, a current signal strength of each of a plurality of wireless access points;

determining, by the wireless device, a discrete level of expected end-to-end data speed for each of the plurality of wireless access points using wireless access point end-to-end data speed information that was historically compiled from prior connections corresponding to previous internet sessions with the plurality of wireless access points and using the detected current signal strength of each of the plurality of wireless access points; and providing, by the wireless device, a user interface comprising the determined discrete level of expected endto-end data speed and the detected signal strength indication of each of the plurality of wireless access points, wherein providing the user interface comprises displaying a user interface that comprises an icon representing the detected signal strength and text representing different determined discrete video resolution levels associated with the expected end-to-end data speed for each of the plurality of wireless access points.

* * * * *